(12) United States Patent
Rhein et al.

(10) Patent No.: US 12,683,104 B2
(45) Date of Patent: Jul. 14, 2026

(54) CAPACITOR HARVESTER

(71) Applicant: Hubbell Incorporated, Shelton, CT (US)

(72) Inventors: David A. Rhein, Birmingham, AL (US); Dragan Tabakovic, Shelton, CT (US)

(73) Assignee: Hubbell Incorporated, Shelton, CT (US)

( * ) Notice: Subject to any disclaimer, the term of this patent is extended or adjusted under 35 U.S.C. 154(b) by 188 days.

(21) Appl. No.: 18/207,500

(22) Filed: Jun. 8, 2023

(65) Prior Publication Data

US 2023/0402240 A1      Dec. 14, 2023

Related U.S. Application Data

(60) Provisional application No. 63/350,705, filed on Jun. 9, 2022, provisional application No. 63/383,999, filed on Nov. 16, 2022.

(51) Int. Cl.
H01H 33/662 (2006.01)
H01H 11/00 (2006.01)
(Continued)

(52) U.S. Cl.
CPC ...... H01H 33/66207 (2013.01); H01H 11/00 (2013.01); H01H 33/143 (2013.01);
(Continued)

(58) Field of Classification Search
CPC ........... H01H 33/66207; H01H 33/143; H01H 33/6606; H01H 33/662; H01H 33/664;
(Continued)

(56) References Cited

U.S. PATENT DOCUMENTS 5,266,758 A * 11/1993 Pham ..................... H01H 33/16
                                                           218/144
6,687,110 B2 * 2/2004 Murray .............. H01H 33/6661
                                                           361/131

(Continued)

FOREIGN PATENT DOCUMENTS

| CN | 112435889 A | 3/2021 |
| CN | 112509854 A | 3/2021 |
| CN | 112786346 A | 5/2021 |

OTHER PUBLICATIONS

PCT/US2023/24834 International Search Report and Written Opinion dated Feb. 8, 2024 (15 pages).
Extended European Search Report dated May 21, 2026 for corresponding European Application No. 23820449.9, pp. 1-7.

*Primary Examiner* — William A Bolton
(74) *Attorney, Agent, or Firm* — Michael Best & Friedrich LLP

(57)      ABSTRACT

A circuit interrupting device including a vacuum interrupter, a separable ceramic capacitor, and an insulating housing. The vacuum interrupter includes a vacuum bottle and first and second contacts disposed within the vacuum bottle. The second contact is movable relative to the first contact between a closed position and an open position. The separable ceramic capacitor is electrically connected in parallel with the vacuum interrupter provided over an outer surface of the vacuum bottle. The insulating housing encloses the separable ceramic capacitor and the vacuum interrupter.

18 Claims, 11 Drawing Sheets

(51) Int. Cl.

| | |
|---|---|
| *H01H 33/14* | (2006.01) |
| *H01H 33/66* | (2006.01) |
| *H01H 33/664* | (2006.01) |
| *H01H 33/666* | (2006.01) |
| *H02H 9/04* | (2006.01) |

(52) U.S. Cl.

CPC ...... *H01H 33/6606* (2013.01); *H01H 33/662* (2013.01); *H01H 33/664* (2013.01); *H01H 33/666* (2013.01); *H02H 9/04* (2013.01); *H01H 2033/6623* (2013.01)

(58) Field of Classification Search

CPC .... H01H 33/666; H01H 33/027; H01H 33/59; H01H 2033/146; H01H 2033/6623; H01H 11/00; H02H 3/20; H02H 3/08; H02H 9/04

USPC ......................................... 218/118, 144, 145

See application file for complete search history.

(56) References Cited

U.S. PATENT DOCUMENTS

| | | | | |
|---|---|---|---|---|
| 7,078,643 | B2 * | 7/2006 | Rostron | H01H 33/166 |
| | | | | 218/144 |
| 10,453,633 | B2 * | 10/2019 | Wang | H01H 33/66261 |
| 10,818,455 | B2 * | 10/2020 | Djogo | H01H 33/66207 |
| 2006/0096856 | A1 * | 5/2006 | Martin | H01H 33/66261 |
| | | | | 204/298.21 |
| 2015/0221464 | A1 * | 8/2015 | Gentsch | H01T 4/08 |
| | | | | 200/293 |
| 2020/0028351 | A1 * | 1/2020 | Agliata | H02J 50/001 |
| 2020/0161065 | A1 | 5/2020 | Djogo | |
| 2020/0195041 | A1 * | 6/2020 | Paudel | G01R 15/06 |
| 2020/0227222 | A1 | 7/2020 | Rhein et al. | |
| 2020/0244059 | A1 | 7/2020 | Lellis Junior et al. | |
| 2021/0175032 | A1 * | 6/2021 | Barker | H01H 33/6662 |

* cited by examiner

700

APPLY A FIRST DIELECTRIC MATERIAL LAYER TO
AN OUTER SURFACE OF THE VACUUM BOTTLE
705

WRAP A FIRST CAPACITOR PLATE AROUND THE VACUUM
BOTTLE
710

APPLY A SECOND DIELECTRIC LAYER AROUND THE
VACUUM BOTTLE
715

WRAP A SECOND CAPACITOR PLATE AROUND THE
VACUUM BOTTLE
720

ENCLOSE THE VACUUM BOTTLE, THE FIRST CAPACITOR
PLATE, AND THE SECOND CAPACITOR PLATE IN AN
INSULATING HOUSING
725

CAPACITOR HARVESTER

RELATED APPLICATIONS

This application claims the benefit of U.S. Provisional Patent Application No. 63/350,705, filed on Jun. 9, 2022 and U.S. Provisional Patent Application No. 63/383,999, filed on Nov. 16, 2022, the entire contents of which are hereby incorporated by reference.

FIELD

The present disclosure relates generally to energy harvesting.

SUMMARY

Electrical power distribution networks deliver power to various distribution transformers, which step down the power from a medium voltage level to a lower voltage that is provided to loads such as homes, businesses, etc. Such power distribution networks include various circuit interrupting devices, such as breakers, reclosers, and other switching devices, that control the flow of power throughout the network. As an example, a network circuit interrupting device, such as a recloser, may include and/or be implemented as a vacuum interrupter that includes opposing contacts moveable between an open position and a closed position.

When a particular circuit interrupting device is closed, known solutions such as current transformers or other series configuration devices are used to harvest power from the power distribution network for powering electronics (e.g., control circuits, actuators, sensors, etc.) included within the circuit interrupting device. However, when the circuit interrupting device is opened, flow of current through the harvesting current transformer is interrupted and, thus, no power is delivered to the electronics. Existing solutions for providing power to the electronics mentioned when the circuit interrupting device open implement bulky energy storage devices, such as batteries and electrolytic capacitors, for harvesting power from a power distribution network. However, such solutions take up large amounts of space and are limited with respect to energy storage capabilities.

A first aspect of the present disclosure provides a circuit interrupting device including a vacuum interrupter, a separable ceramic capacitor, and an insulating housing. The vacuum interrupter includes a vacuum bottle and first and second contacts disposed within the vacuum bottle. The second contact is movable relative to the first contact between a closed position and an open position. The separable ceramic capacitor is electrically connected in parallel with the vacuum interrupter and provided over an outer surface of the vacuum bottle. The insulating housing encloses the capacitor and the vacuum interrupter.

Another aspect of the present disclosure provides a recloser including a terminal configured to electrically connect the recloser to a power line included in a power distribution network and one or more electronic components. The recloser further includes a vacuum interrupter electrically connected between the terminal and the one or more electronic components, the vacuum interrupter including a first contact and a second contact movable relative to the first contact between a closed position and an open position. The recloser further includes a separable ceramic capacitor electrically connected in parallel with the vacuum interrupter and an insulating housing that encloses the separable ceramic capacitor and the vacuum interrupter.

Another aspect of the present disclosure provides a method of manufacturing a vacuum interrupter including a vacuum bottle enclosing first and second contacts. The method includes sliding a separable ceramic capacitor over the vacuum bottle, and enclosing the vacuum bottle and the separable ceramic capacitor in an insulating housing.

Other aspects of the application will become apparent by consideration of the detailed description and accompanying drawings.

DETAILED DESCRIPTION

Figure 1:
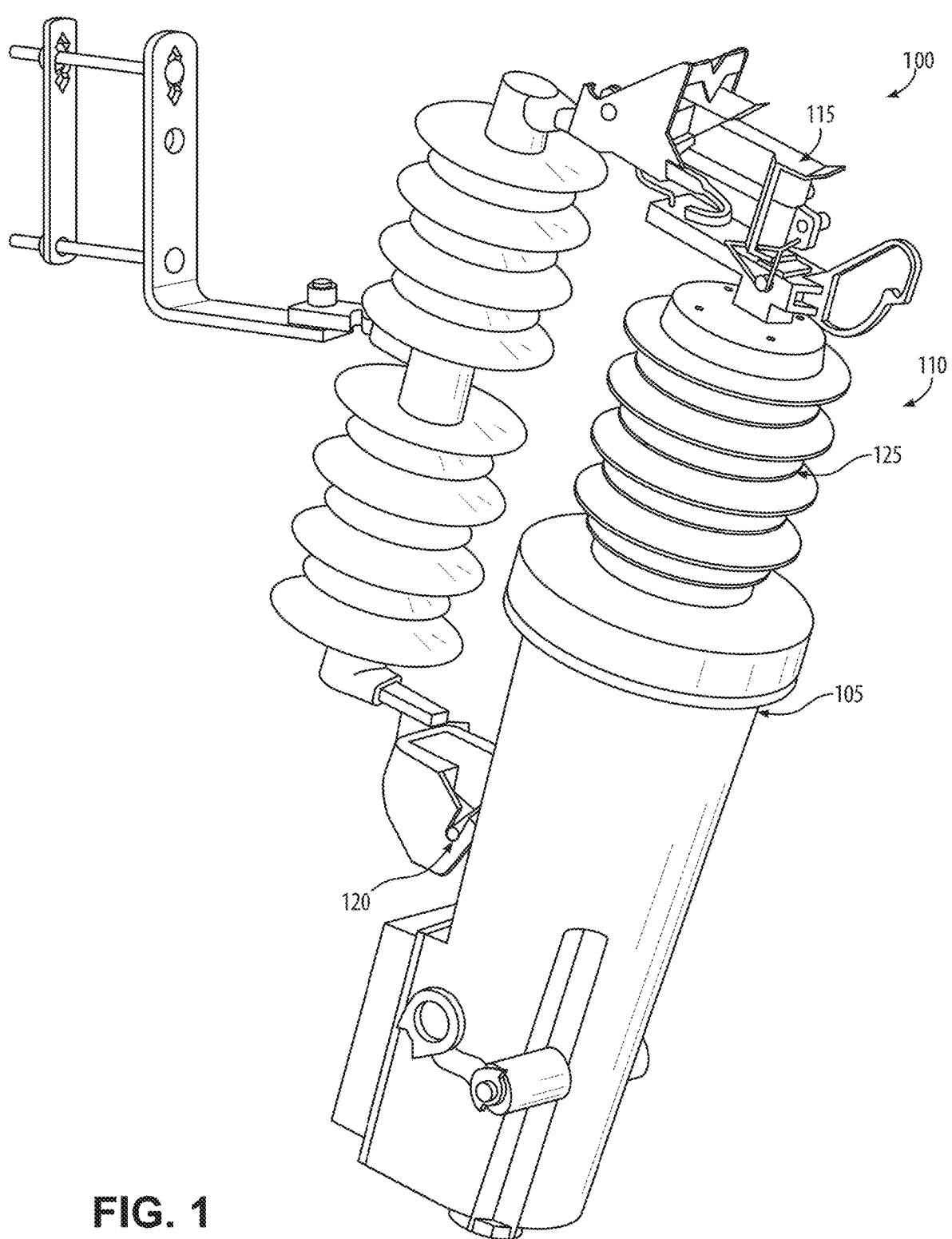
FIG. 1 illustrates a perspective view of a circuit interrupting device, such as a recloser, according to some aspects.

Before any embodiments of the application are explained in detail, it is to be understood that the application is not limited in its application to the details of construction and the arrangement of components set forth in the following description or illustrated in the following drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

Functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not explicitly listed.

FIG. 1 illustrates a circuit interrupting device, such as a recloser, 100 included in a power distribution network according to some examples. Although the circuit interrupting device is described herein as being implemented as a recloser 100, it should be understood that certain aspects of the recloser 100 may also be incorporated in other types of circuit interrupting devices that do not reclose, such as but not limited to non-reclosing circuit breakers and other types of switching devices included in a power distribution network.

The recloser 100 includes a housing 105 that contains and/or supports one or more components for electrically connecting and disconnecting the recloser 100 to and from a power distribution network. In the illustrated example, the housing 105 includes an upper housing portion that contains, for example, a vacuum interrupter 110 and a lower housing portion that contains, or otherwise supports, control electronics, an actuator, and/or various other electrical and mechanical components included in the recloser 100. The recloser 100 further includes first and second terminals 115, 120 that electrically connect the recloser 100 to a power line included in the power distribution network. In the illustrated example, terminal 115 extends outward from a top surface of the vacuum interrupter 110 and the second, or lower, terminal 120 extends outward from a side surface of the lower portion of the housing 105.

Figure 2:
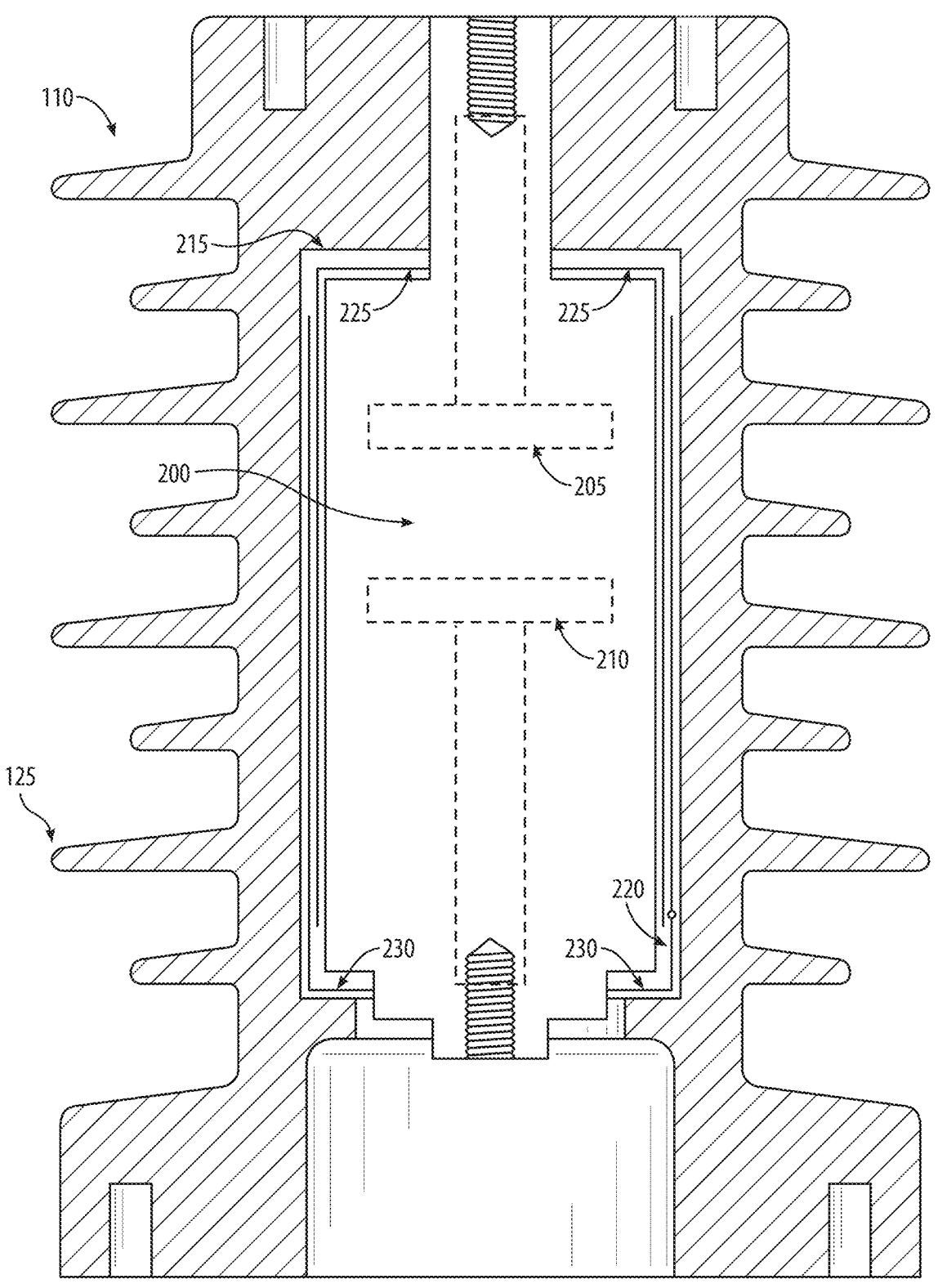
FIG. 2 illustrates a cross-sectional view of a vacuum interrupter, according to some aspects.

The vacuum interrupter 110 includes an insulating housing 125 that encloses, or contains, a vacuum bottle 200 (FIG. 2). The insulating housing 125 is formed of, for example, one or more insulating materials. The vacuum bottle 200 defines a vacuum chamber that encloses a fixed contact 205 and a moveable contact 210. The fixed contact 205 is electrically connected to the upper terminal 115 of the recloser 100 and the moveable contact 210 is electrically connected to the lower terminal 120 of the recloser 100. When the fixed and moveable contacts 205, 210 are in contact with each other (e.g., the vacuum interrupter 110 is closed), current flows from a power line of the power distribution network through the contacts 205, 210 of the vacuum interrupter 110. The current that flows through vacuum interrupter 110 while the contacts 205, 210 are in contact with each other is converted and used to power a load, such as one or more electronics included in the recloser 100. For example, one or more of a controller, control circuits, sensors, an actuator, communication devices, and/or other circuit components are powered with the converted line current that flows through the vacuum interrupter 110, for example, via a current transformer 315 (shown in FIG. 3).

When the fixed and moveable contacts 205, 210 are separated to open the vacuum interrupter 110 (as shown in FIG. 2), current does not flow through the contacts 205, 210 of the vacuum interrupter 110. Thus, there is no current flowing through the vacuum interrupter 110 that can be used to power the electronics included in the recloser 100 when the vacuum interrupter 110 is open. Accordingly, the present disclosure proposes electrically connecting a capacitor in parallel with the vacuum interrupter 110 to harvest energy from the power distribution network when the vacuum interrupter 110 is open.

Figure 3:
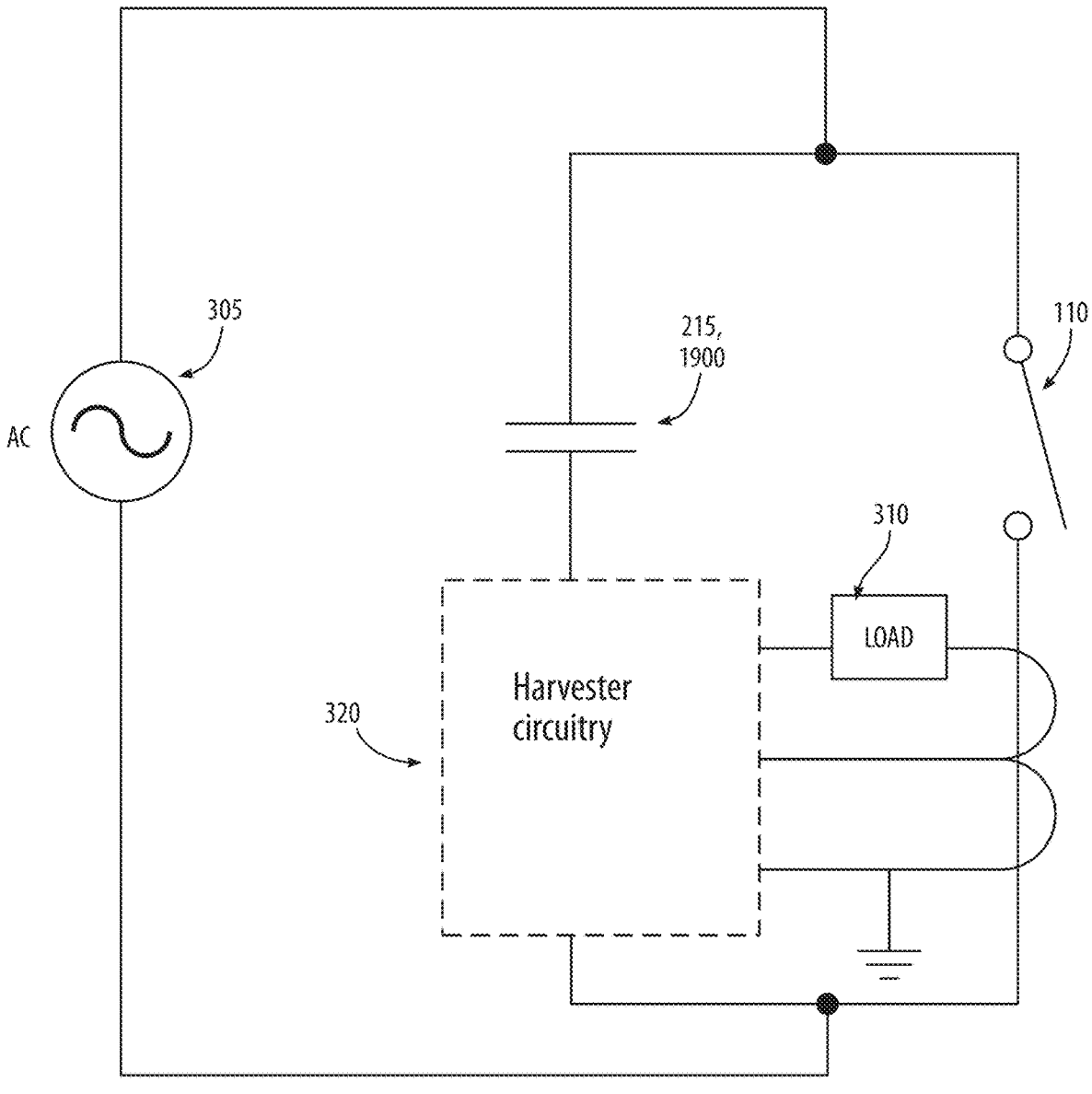
FIG. 3 illustrates a schematic of an energy harvesting circuit included in the recloser of FIG. 1, according to some aspects.

FIG. 3 is a schematic diagram of the recloser 100 in which a high voltage, high impedance capacitor 215 is electrically connected in parallel with the vacuum interrupter 110. For example, the capacitor 215 and the vacuum interrupter 110 are electrically connected in parallel between a power line 305 included in the power distribution network and a load 310 that includes one or more of the electronics, such as a controller, sensors, an actuator, communication devices, and/or other circuit components included in the recloser 100. When the vacuum interrupter 110 is closed (e.g., the fixed and moveable contacts 205, 210 are in contact with each other), current flows from the power line 305 in the distribution network and through the lower impedance vacuum interrupter 110, as the impedance of vacuum interrupter 110 is much smaller, or less, than the impedance of the high voltage, high impedance capacitor 215. Moreover, current from the power line 305 does not flow through the capacitor 215 when the vacuum interrupter 110 is closed because the impedance of the vacuum interrupter 110 is much less than the impedance of the capacitor 215. That is, the vacuum interrupter 110 shorts the capacitor 215 when the vacuum interrupter 110 is closed. A current transformer 315 is connected in series with the vacuum interrupter 110 and provides power to the load 310 when the vacuum interrupter 110 is closed and conducting current.

When the vacuum interrupter 110 is open (e.g., the fixed and moveable contacts 205, 210 are separated), a relatively small current flows through the high voltage, high impedance capacitor 215 that is harvested for powering the load 310. For example, when the vacuum interrupter 110 is open, the capacitor 215 harvests, or conducts, AC current from the power line 305 and the harvester circuit 320 converts the harvested AC current into direct current (DC) current for powering the electronics included in the load 310.

Figure 4:
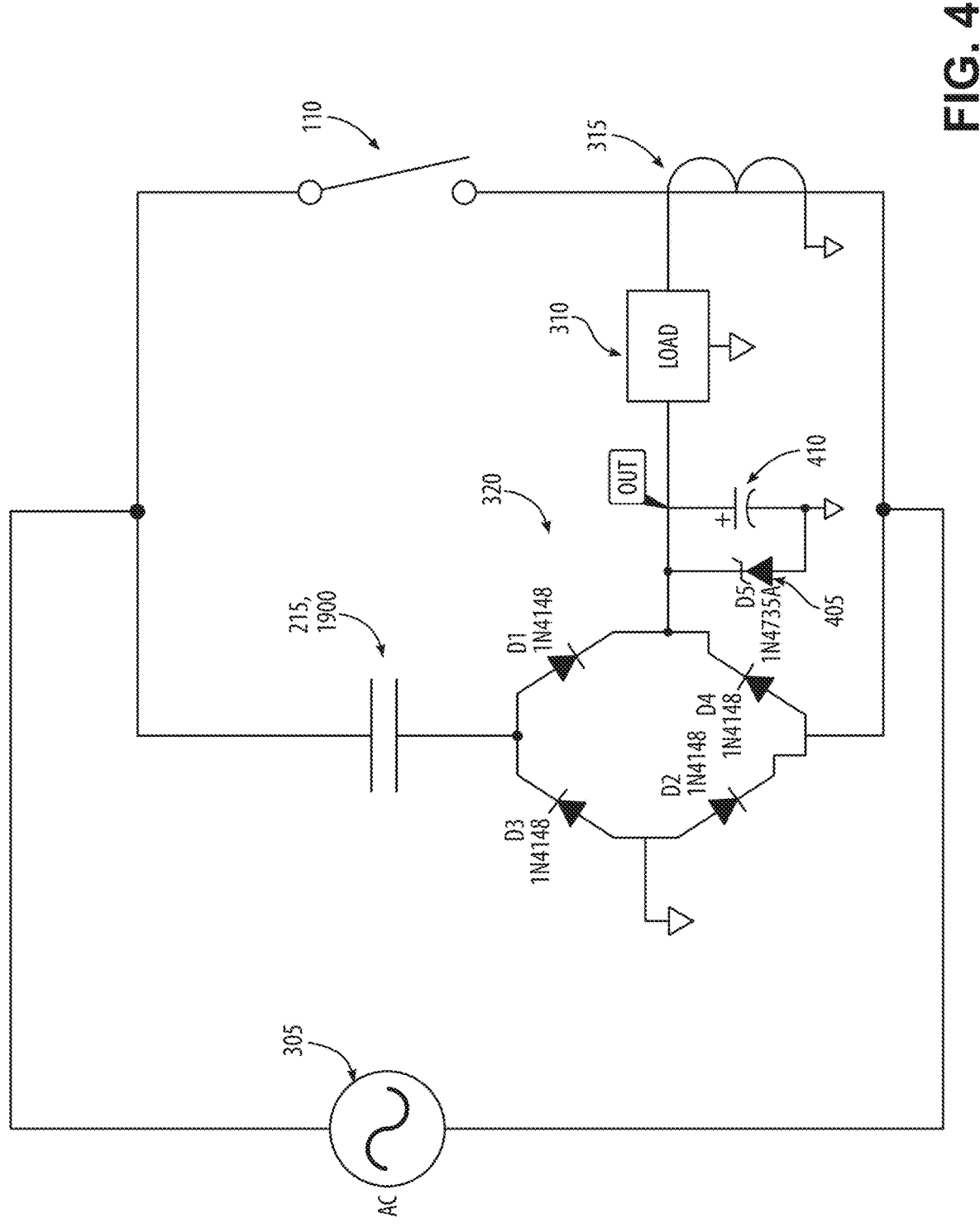
FIG. 4 a schematic of an energy harvesting circuit included in the recloser of FIG. 1, according to some aspects.

FIG. 4 illustrates an example circuit schematic in which the harvester circuit 320 includes a rectifier 400, a zener diode 405, and a load capacitor 410. The rectifier 400 converts the AC current output by the capacitor 215 into a DC current used for powering the load 310. In the illustrated example, the rectifier 400 is implemented as a diode bridge rectifier. However, it should be understood that in other examples, the rectifier 400 is implemented as a different type of rectifier circuit. The load capacitor 410 is charged by and powers the load 310 with DC current output by the rectifier 400. For example, the load capacitor 410 outputs power to the load 310 at a voltage level that is approximately equal to the breakdown voltage of the zener diode 405. In some instances, the load capacitor is implemented as an electrolytic capacitor. In other instances, the load capacitor 410 is replaced with a different type of energy storage device.

Figure 5:
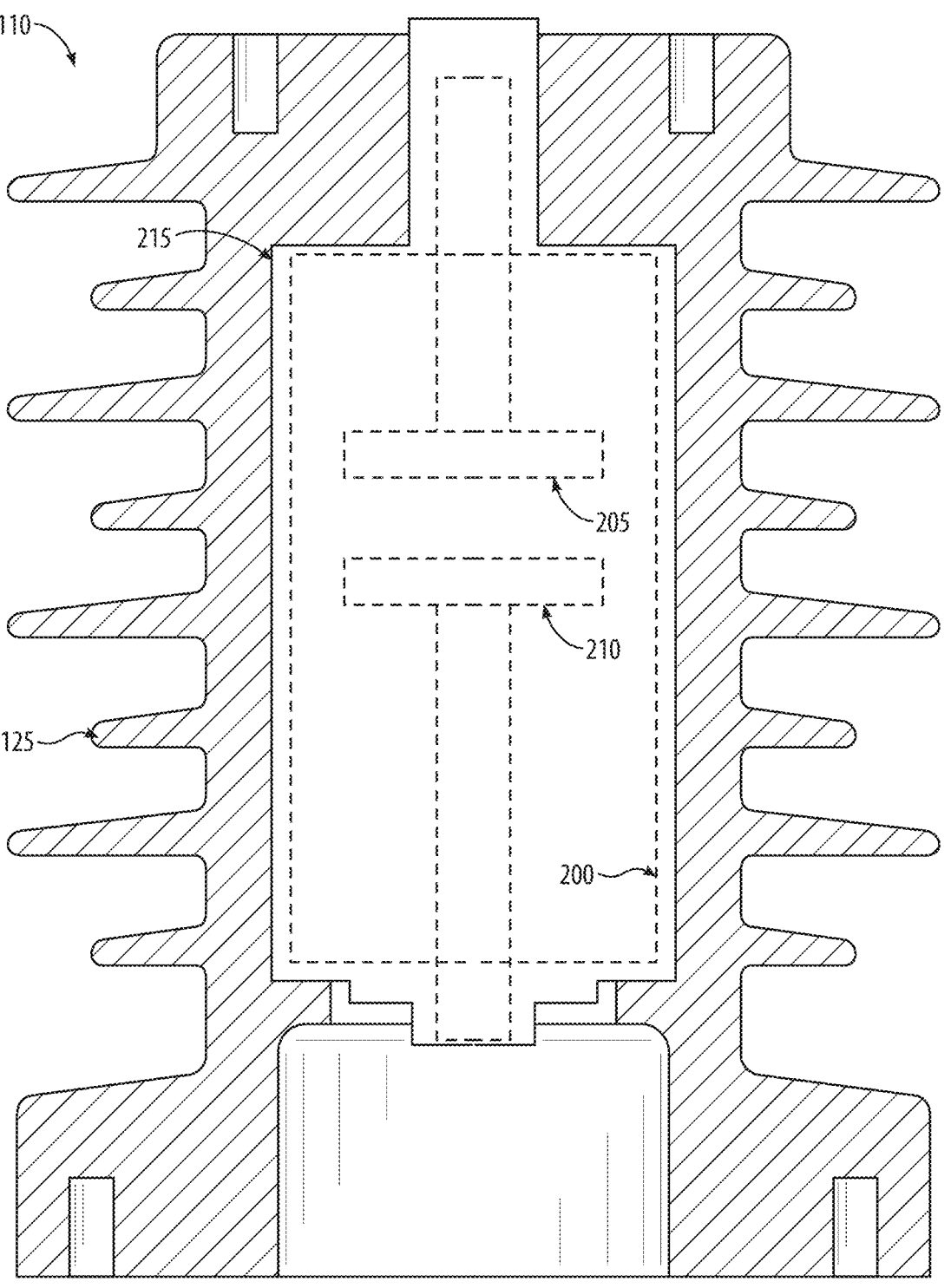
FIG. 5 illustrates a cross-sectional view of a vacuum interrupter, according to some aspects.
Figure 6:
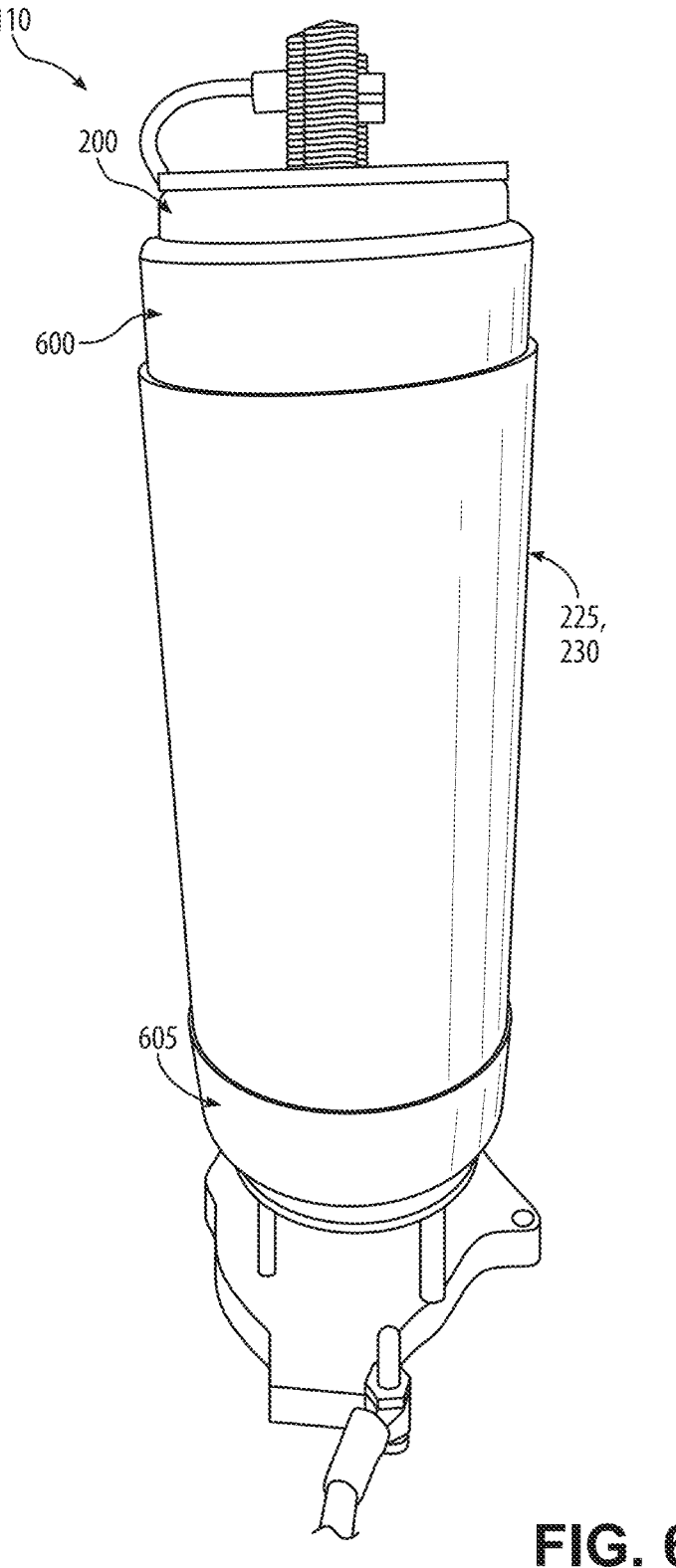
FIG. 6 illustrates a perspective view in which the insulating housing of the vacuum interrupter is removed, according to some aspects.
Figure 9:
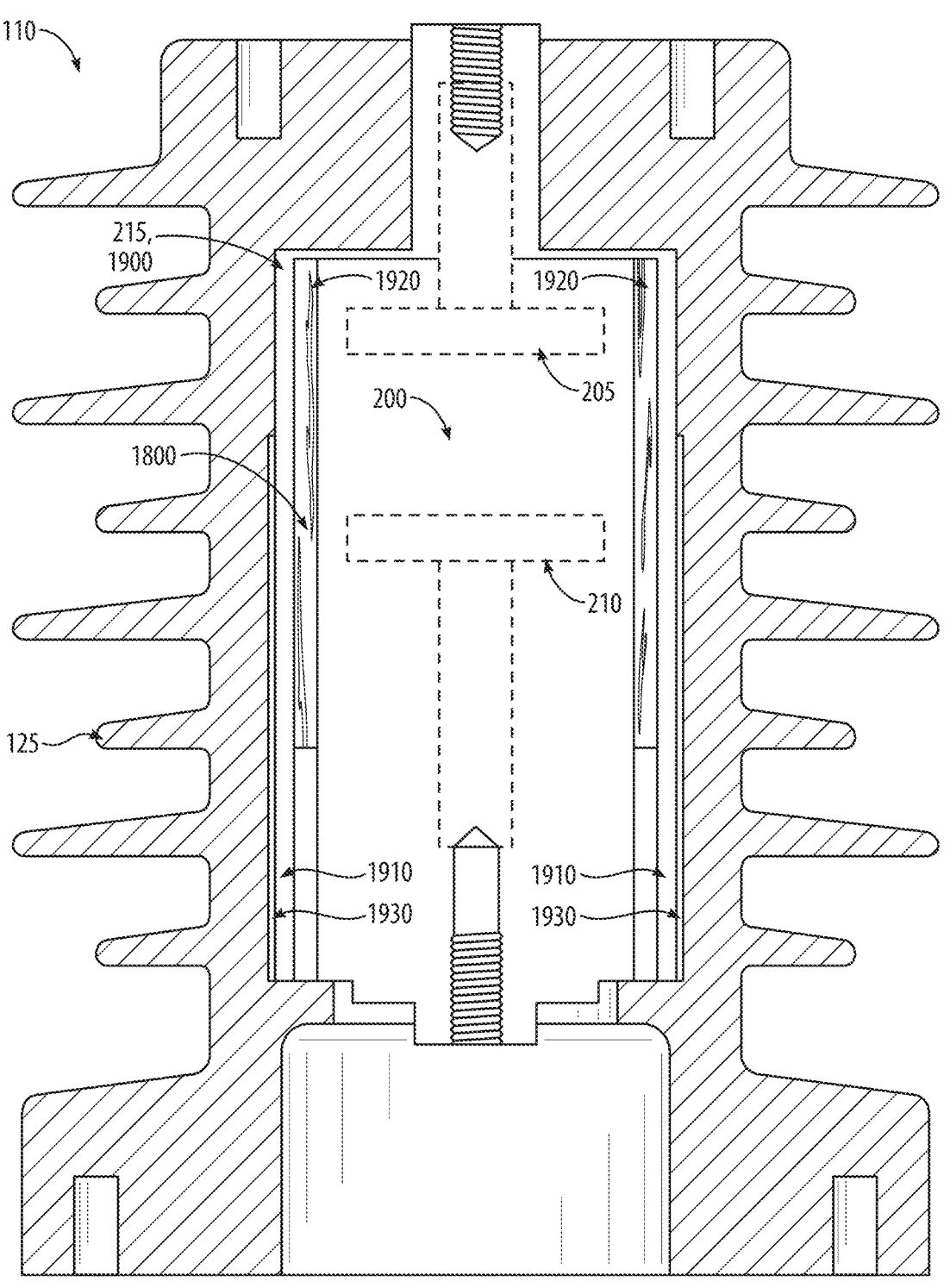
FIG. 9 a cross-sectional view of a vacuum interrupter, according to some aspects.

In some instances, the capacitor 215 and the vacuum interrupter 110 are integrated in a single package. For example, in some instances, the capacitor 215 is contained within the insulating housing 125 of the vacuum interrupter 110. In such instances, the capacitor 215 is located between an outer surface of the vacuum bottle 200 and an inner surface of the insulating housing 125 of the vacuum interrupter 110. Moreover, in such instances, the capacitor 215 is a cylindrical capacitor that is positioned to surround, or wrap around, the vacuum bottle 200 of the vacuum interrupter 110. For example, FIGS. 2, 5, and 6 illustrate an example in which the capacitor 215 is implemented as a cylindrical capacitor that is wrapped around the vacuum bottle 200 and disposed within an interior of the insulating housing 125. FIGS. 9-11 illustrate an example in which the capacitor 215 is implemented as a separable ceramic capacitor that is provided over the vacuum bottle 200 and disposed within an interior of the insulating housing 125.

Figure 8:
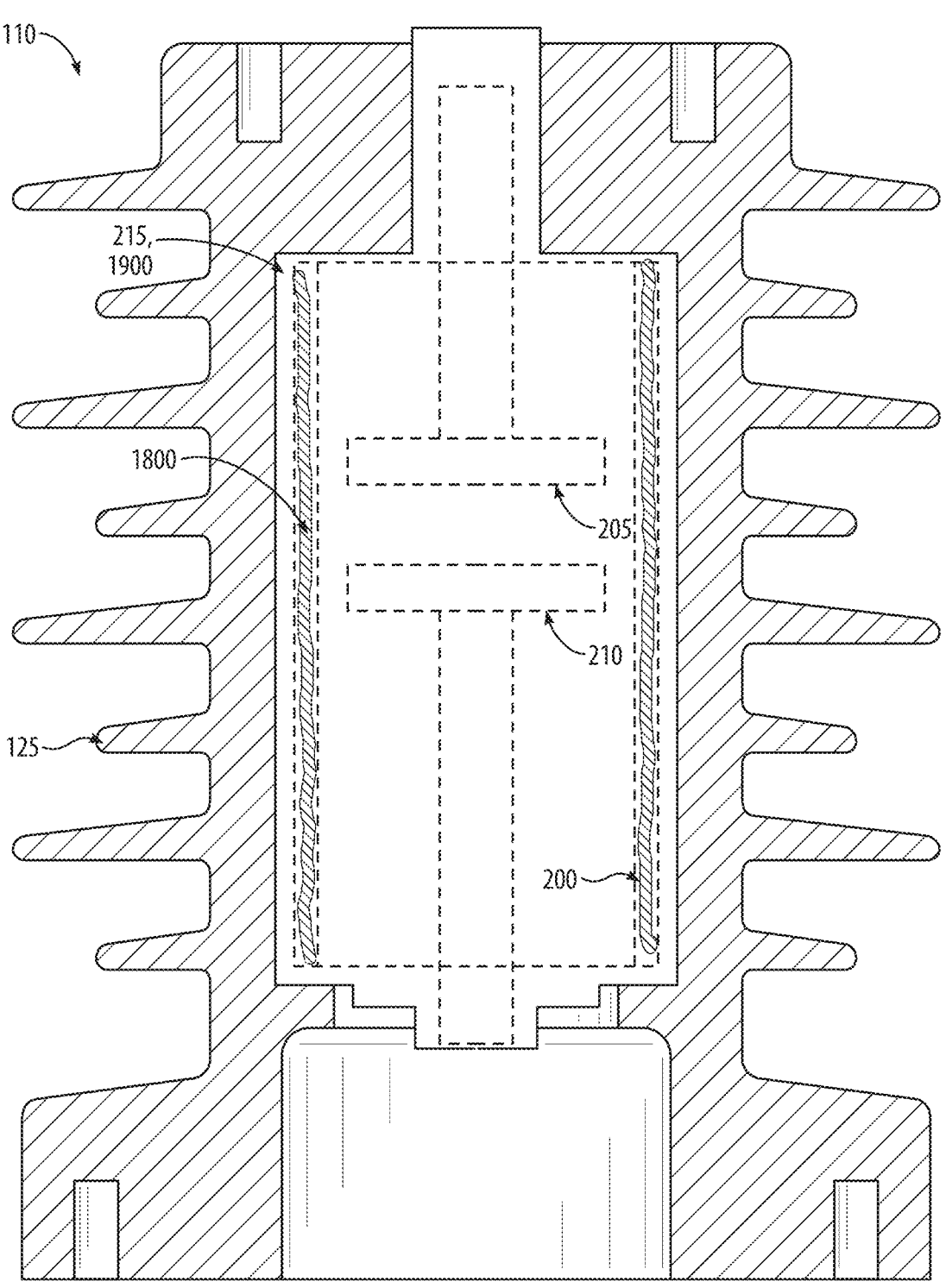
FIG. 8 illustrates a cross-sectional view of a vacuum interrupter, according to some aspects.

In other instances, the capacitor 215 is located between an insulating jacket, such as a silicone jacket, wrapped around an outer surface of the vacuum bottle 200 and an inner surface of the insulating housing 125 of the vacuum interrupter 110. Moreover, in such instances, the capacitor 215 is a cylindrical capacitor that is positioned to surround, or wrap around, the insulating jacket that is wrapped around, or otherwise disposed on, the vacuum bottle 200 of the vacuum interrupter 110. FIG. 8 illustrates an example in which an insulating jacket 1800 is wrapped around the vacuum bottle 200 before the capacitor 215 is installed, such that when installed, the capacitor 215 is disposed between an insulating jacket, such as a silicone jacket, wrapped around or provided over an outer surface of the vacuum bottle 200 and an inner surface of the insulating housing 125 of the vacuum interrupter 110. The description of FIGS. 3, 4, and 8 is provided with respect to the capacitor 215 (that is, a cylindrical capacitor illustrated in FIGS. 2, 5, and 6). However, it will be apparent to one of ordinary skill in the art that the description of FIGS. 3, 4, and 8 is equally application to the separable ceramic capacitor 1900.

As shown in FIG. 2, the capacitor 215 is formed of a dielectric material 220, a first cylindrical capacitor plate 225, and a second cylindrical capacitor plate 230. When the capacitor 215 is positioned within the vacuum interrupter 110, a layer of dielectric material 220 is formed between the outer surface of the vacuum bottle 200 and the insulating housing 125. The first and second cylindrical capacitor plates 225, 230 are spaced apart within the layer of dielectric material 220 such that the first and second capacitor plates 225, 230 wrap around the vacuum bottle 200 without contacting a surface of the vacuum bottle 200 or the insulating housing 125. That is, the capacitor 215 is formed such that the first cylindrical capacitor plate 225 is spaced apart from an outer surface of the vacuum bottle 200 and the second cylindrical capacitor plate 230 by the dielectric material 220. Similarly, the second cylindrical capacitor plate 230 is spaced apart from the first cylindrical capacitor plate 225 and an inner surface of the insulating housing 125 by the dielectric material 220.

Accordingly, as shown in FIGS. 2 and 5, the vacuum interrupter 110 is constructed such that the capacitor 215 is disposed between the outer surface of vacuum bottle 200 and the insulating housing 125. Moreover, the capacitor 215 is electrically connected in parallel with the fixed and moveable contacts 205, 210 of the vacuum interrupter 110, as the first cylindrical capacitor plate 225 is electrically connected to the upper terminal 115 and the second cylindrical capacitor plate 230 is electrically connected to the harvester circuit 320 and/or the load 310. In the illustrated example of FIG. 8, an insulating jacket, such as a silicone jacket, 1800 is wrapped around, or otherwise disposed on, the outer surface of the vacuum bottle 200 such that the capacitor 215 is disposed between the insulating jacket 1800 and the insulating housing 125.

FIG. 6 illustrates a perspective view of the single package including the vacuum interrupter 110 and the capacitor 215 in which the insulating housing 125 has been removed. As shown, a first layer 600 of dielectric material 220 is wrapped around the vacuum bottle 200. The first and second cylindrical capacitor plates 225, 230 are wrapped around the first layer 600 of dielectric material 220, with a second layer (not shown) of dielectric material 220 disposed between the first and second cylindrical capacitor plates 225, 230. A third layer 605 of dielectric material 220 is formed on an outer surface of the second cylindrical capacitor plate 230 such that the third layer 605 separates the second cylindrical capacitor plate 230 from the insulating housing 125.

In some instances, the first and second capacitor plates 225, 230 are positioned within the vacuum bottle 200. In such instances, the size of the vacuum bottle 200 and cylindrical capacitor plates 225, 230 is increased, as the dielectric constant of a vacuum is much lower than the dielectric constant of the dielectric material 220 used to form the capacitor 215.

Figure 7:
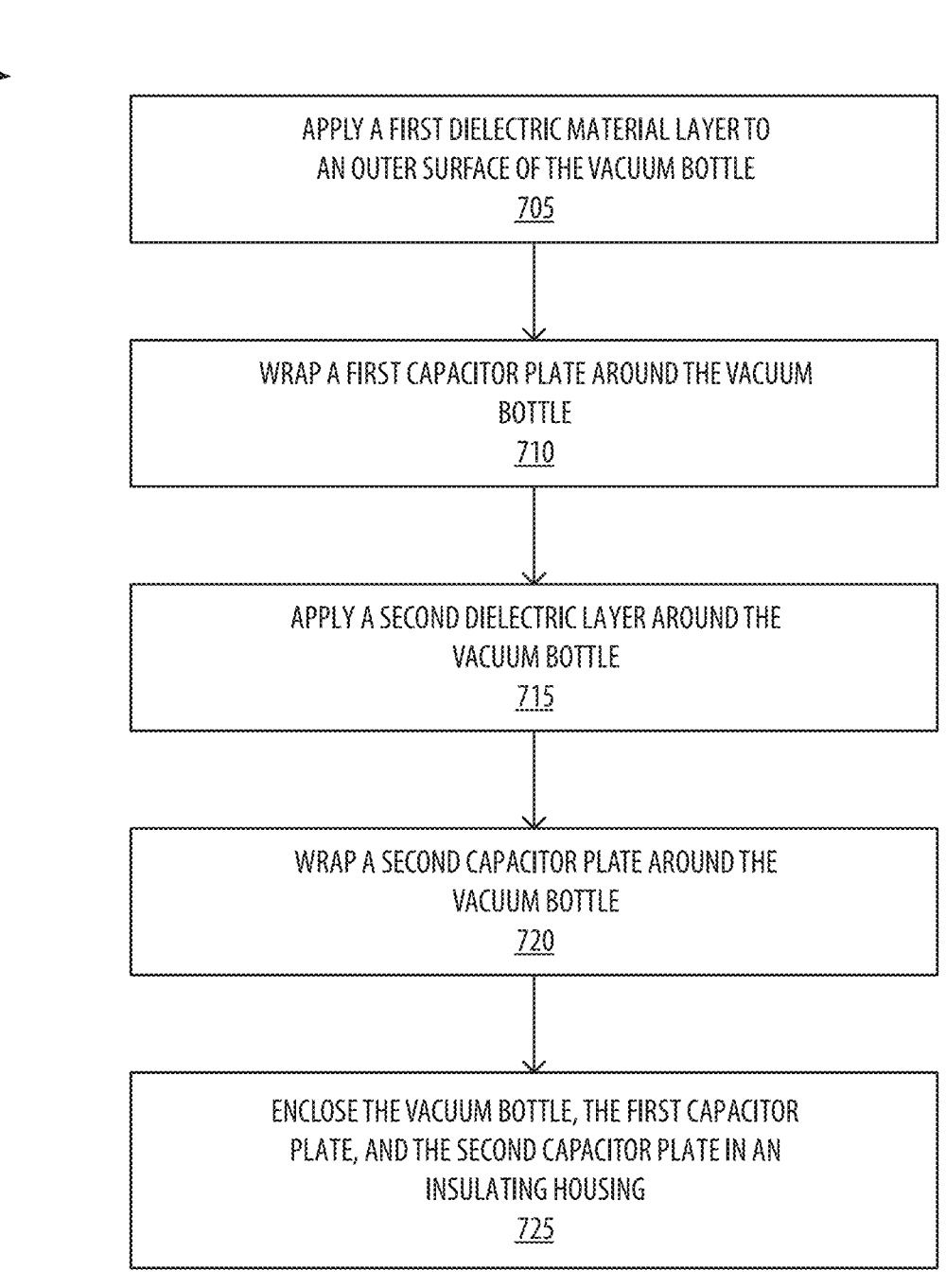
FIG. 7 is a flowchart illustrating a method for manufacturing a vacuum interrupter, according to some aspects.

FIG. 7 is a flowchart illustrating a method, or process, 700 for manufacturing a vacuum interrupter, such as the vacuum interrupter 110, in accordance with the present disclosure. The process 700 includes applying a first dielectric material layer, such as the first layer 600, to an outer surface of the vacuum bottle 200 (block 705). In some instances, the process begins with first wrapping a silicone insulating jacket 1800 around the outer surface of the vacuum bottle 200 before applying the first dielectric material layer, such as the first layer 600. In such instances, the first dielectric material layer is then applied to an outer surface of the silicone insulating jacket 1800 wrapped around the outer surface of the vacuum bottle 200.

The process 700 proceeds with wrapping a first capacitor plate, such as the first cylindrical capacitor plate 225, around the vacuum bottle 200 (block 710). The process 700 also includes applying a second dielectric material layer around the vacuum bottle 200, for example, around the first cylindrical capacitor plate 225 (block 715) and wrapping a second capacitor plate, such as the second cylindrical capacitor plate 230, around the vacuum bottle 200 (block 715). In some instances, the process 700 includes the step of applying the second dielectric material layer around the first cylindrical capacitor plate 225 before the second cylindrical capacitor plate 230 is wrapped around the vacuum bottle 200, such that the second dielectric material layer is disposed between the first and second cylindrical capacitor plates 225, 230.

At block 725, the process 700 proceeds with enclosing the vacuum bottle 200, the first cylindrical capacitor plate 225, and the second cylindrical capacitor plate 230 in an insulating housing, such as the insulating housing. In some instances, the process 700 further includes applying a third dielectric material around the second cylindrical capacitor plate 230 before enclosing the vacuum bottle 200 and the first and second cylindrical capacitor plates 225, 230 with the insulating housing 125, such that the third dielectric material layer is disposed between the second cylindrical capacitor plate 230 and an inner surface of the insulating housing 125. In addition, the power distribution system type components and associated control devices contemplated by the present disclosure include, but are not limited to, line disconnects, fault interrupters, power line monitors, power factor correction devices, and load switching devices and other overhead distribution switches, insulators, and arresters. Non-limiting examples of line disconnects includes sectionalizers. Non-limiting examples of fault interrupters include breakers and reclosers. Non-limiting examples of power line monitors includes sensors and fault locators. Non-limiting examples of power factor correction devices include capacitor switches. Non-limiting examples of load switching devices include load-break switches. For ease of description, the power distribution system type components may also be referred to herein collectively as the "distribution components" in the plural and the "distribution component" in the singular.

FIG. 9 illustrates the vacuum interrupter 110 implemented using a separable ceramic capacitor 1900. The separable ceramic capacitor 1900 is similar to the capacitor 215, with the properties of the capacitor 215 interchangeable with the separable ceramic capacitor 1900. As shown in FIG. 9, the capacitor 1900 is formed of a ceramic dielectric material 1910, a first metallized plate 1920, and a second metallized plate 1930. When the capacitor 1900 is positioned within the vacuum interrupter 110, a layer of the ceramic dielectric material 1910 may be formed between the outer surface of the vacuum bottle 200 and the insulating housing 125. The separable ceramic capacitor 1900 has an inner diameter that allows for sliding the separable ceramic capacitor 1900 over the vacuum bottle 200 and/or the insulating jacket 1800 (see FIG. 8). An optional dielectric material or an air gap may also be provided between the first metallized plate 1920 and the vacuum bottle 200.

The vacuum interrupter 110 is constructed such that the separable ceramic capacitor 1900 is disposed between the outer surface of vacuum bottle 200 and the insulating housing 125. The separable ceramic capacitor 1900 is electrically connected in parallel with the fixed and moveable contacts 205, 210 of the vacuum interrupter 110, as the first metallized plate 1920 is electrically connected to the upper terminal 115 and the second metallized plate 1930 is electrically connected to the harvester circuit 320 and/or the load 310. In the illustrated example of FIG. 8, an insulating jacket, such as a silicone jacket, 1800 is wrapped around, or otherwise disposed on, the outer surface of the vacuum bottle 200 such that the separable ceramic capacitor 1900 is disposed between the insulating jacket 1800 and the insulating housing 125. The insulating jacket (e.g., silicone jacket) is optional and may not be needed.

Figure 10B:
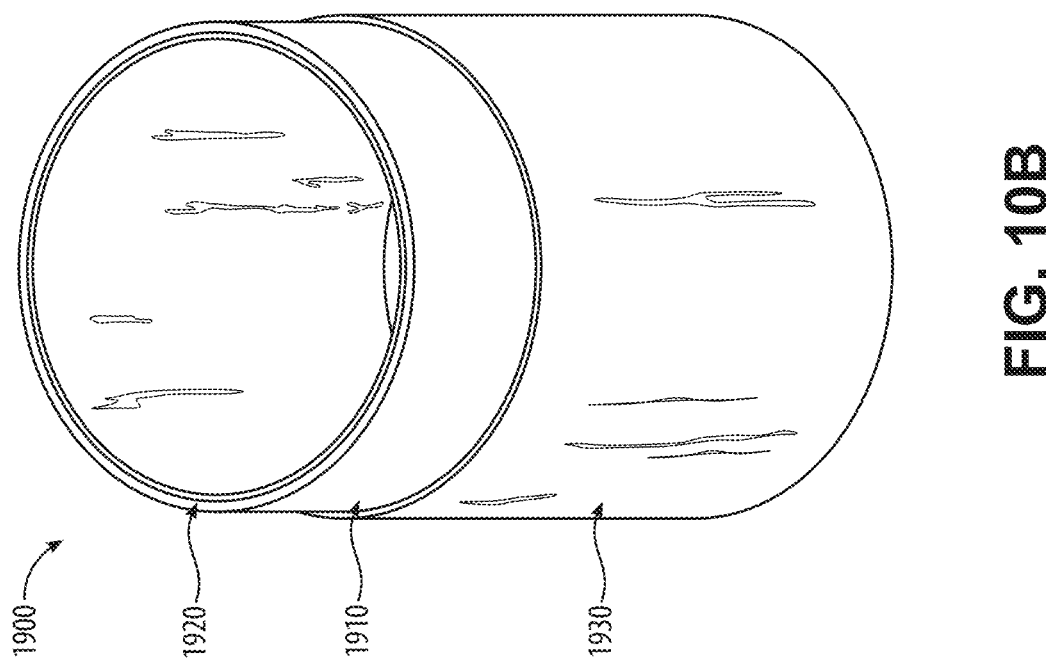
FIG. 10B illustrates a perspective view of tubular ceramic harvester of the vacuum interrupter of FIG. 9 during an assembly process, according to some aspects.
Figure 10A:
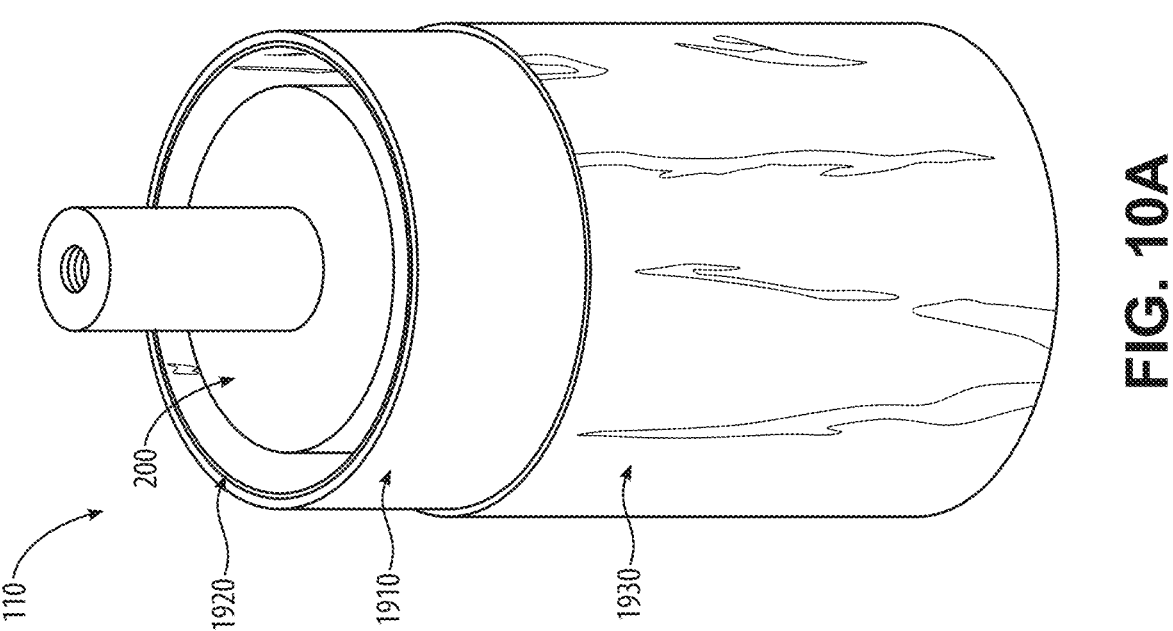
FIG. 10A illustrates a perspective view of vacuum interrupter and harvester during an assembly process, according to some aspects.
Figure 11:
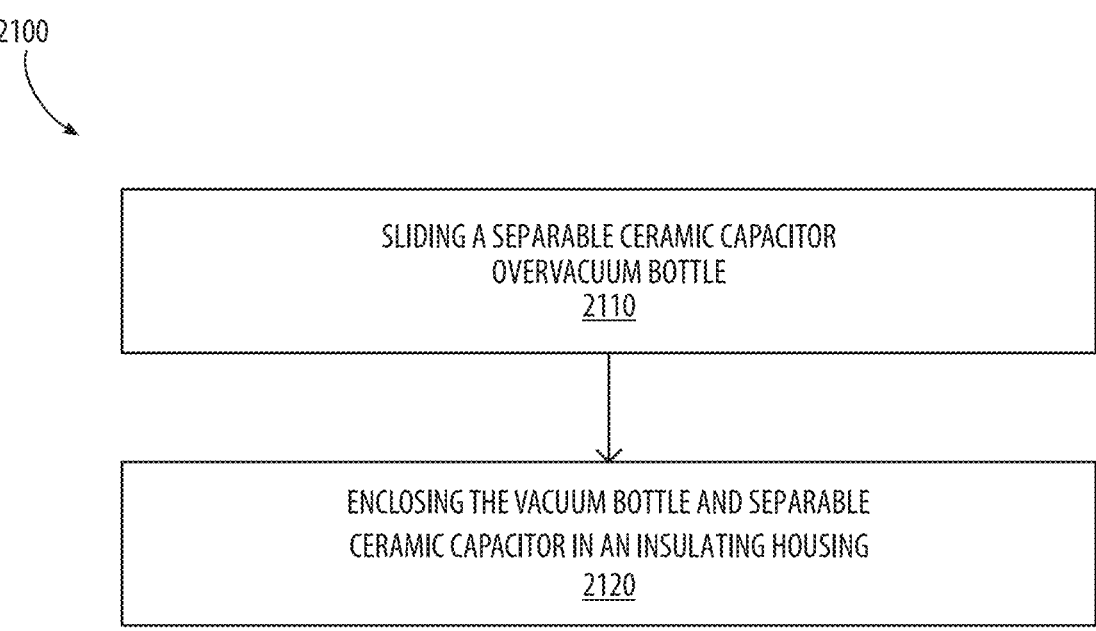
FIG. 11 is a flowchart illustrating a method for manufacturing a vacuum interrupter, according to some aspects.

FIGS. 10A and 10B illustrate perspective views of the separable ceramic capacitor 1900. The separable ceramic capacitor 1900 includes axially offset metallized capacitor plates 1920, 1930. The metallized capacitor plates 1920, 1930 and the ceramic dielectric material 1910 are cylindrical in shape. The inner diameter of the second metallized plate 1930 is larger than the outer diameter of the first metallized plate 1920. The inner diameter of the second metallized plate 1930 and the outer diameter of the first metallized plate 1920 are configured to accommodate the ceramic dielectric material 1910. The axially offsetting and the varying diameters of the metallized plates 1920, 1930 provides the desired dielectric gap for the voltage applied. The separable ceramic capacitor 1900 is a hollow cylinder allowing for the separable ceramic capacitor 1900 to be slid over the vacuum bottle 200. The separable ceramic capacitor 1900 includes a first opening on a first side and a second opening on a second side.

FIG. 11 is a flowchart illustrating a method, or process, 2100 for manufacturing a vacuum interrupter, such as the vacuum interrupter 110, in accordance with the present disclosure. The process 2100 includes sliding the separable ceramic capacitor 1900 over the vacuum bottle 200 (block 2110). As discussed above, the separable ceramic capacitor 1900 has an inner diameter that allows for the separable ceramic capacitor 1900 to be slid over the vacuum bottle 200. The vacuum bottle 200 is manufactured separately from the separable ceramic capacitor 1900 such that the assembly of the vacuum interrupter 110 is simplified. Specifically, the separable ceramic capacitor 1900 can simply be slid over the vacuum bottle 200 during assembly.

The components of the separable ceramic capacitor 1900 may similarly be manufactured separately. Specifically, the first metallized plate 1920, the second metallized plate 1930 and the ceramic dielectric material 1910 may be manufactured separated and assembled together to form the separable ceramic capacitor 1900. The metallized plates 1920, 1930 may include metal plates or metal-coated plates. During assembly, the ceramic dielectric material 1910 is slid over the first metallized plate 1920 and the second metallized plate 1930 is slid over the ceramic dielectric material 1910. In some embodiments, the ceramic dielectric material 1910 and the metallized plates 1920, 1930 may be held together by virtue of the tight fit provided between the ceramic dielectric material 1910 and the metallized plates 1920, 1930. In other embodiments, an adhesive or fasteners may be fix the ceramic dielectric material 1910 to the metallized plates 1920, 1930. Similar fixing techniques may also be used for fixing the separable ceramic capacitor 1900 to the vacuum bottle 200. In the example illustrated, the metallized plates 1920, 1930 have a length smaller than the length of the ceramic dielectric material 1910 to allow for axially offsetting the metallized plates 1920, 1930. The ceramic dielectric material 1910 may have a length that is substantially the same as the length of the main body of the vacuum bottle 200. The length of the metallized plates 1920 and 1930 may be selected based on the desired capacitance, voltage, and current characteristics of the separable ceramic capacitor 1900.

At bock 2120, the process 2100 proceeds with enclosing the vacuum bottle 200 and the separable ceramic capacitor 1900 in an insulating housing, such as the insulating housing 125. In some embodiments, an insulating layer of dielectric material may be provided over the metallized plates 1920, 1930 to achieve dielectric withstand. The insulating layer of dielectric material may be added by sliding the insulating layer over the metallized plates 1920, 1930. In addition, the power distribution system type components and associated control devices contemplated by the present disclosure include, but are not limited to, line disconnects, fault interrupters, power line monitors, power factor correction devices, and load switching devices and other overhead distribution switches, insulators, and arresters. Non-limiting examples of line disconnects includes sectionalizers. Non-limiting examples of fault interrupters include breakers and reclosers. Non-limiting examples of power line monitors includes sensors and fault locators. Non-limiting examples of power factor correction devices include capacitor switches. Non-limiting examples of load switching devices include load-break switches. For ease of description, the power distribution system type components may also be referred to herein collectively as the "distribution components" in the plural and the "distribution component" in the singular.

The voltage harvesting device according to the present disclosure may be used with live ungrounded devices or with pole-based control devices, which are usually grounded. It will be understood that various modifications can be made to the embodiments of the present disclosure without departing from the spirit and scope thereof. All values set forth herein are exemplary and can be modified depending upon the line voltage (Vsource) and line continuous wattage, the voltage and power requirements of the control device, and the characteristics and properties of the voltage harvesting device. This includes the values for the physical dimensions and the resistance and power characteristics of the resistor and transformer and other elements used with or incorporated into the voltage harvesting device, such as the overvoltage disconnects and the voltage converter. Additionally, though the voltage harvesting circuit within the voltage harvesting device may only include the transformation circuit, i.e., the resistor/transformer voltage divider, the voltage harvesting circuit may also include other elements, such as the first overvoltage disconnect device, the second overvoltage disconnect device and/or the voltage converter. Therefore, the above description should not be construed as limiting the disclosure, but merely as embodiments thereof. Those skilled in the art will envision other modifications within the scope and spirit of the invention as defined by the claims appended hereto.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A circuit interrupting device comprising:
   a vacuum interrupter including
      a vacuum bottle, and
      a first contact and a second contact disposed within the vacuum bottle, the second contact movable relative to the first contact between a closed position and an open position;
   a separable ceramic capacitor electrically connected in parallel with the vacuum interrupter and provided over an outer surface of the vacuum bottle, wherein the separable ceramic capacitor is electrically connected between an alternating current (AC) line voltage source and a converter; and an insulating housing that encloses the separable ceramic capacitor and the vacuum interrupter.

2. The circuit interrupting device of claim 1, wherein the separable ceramic capacitor is cylindrical and has an inner diameter configured for sliding over the vacuum bottle.

3. The circuit interrupting device of claim 1, wherein the separable ceramic capacitor includes a ceramic dielectric material provided between metallized plates, wherein the ceramic dielectric material provides a dielectric gap for the separable ceramic capacitor, wherein the metallized plates are offset axially.

4. The circuit interrupting device of claim 3, wherein the separable ceramic capacitor is hollow and includes a first opening on a first side and a second opening on a second side.

5. The circuit interrupting device of claim 4, wherein the separable ceramic capacitor is slidingly received over the vacuum bottle.

6. The circuit interrupting device of claim 1, further comprising:
   an insulating jacket disposed on the outer surface of the vacuum bottle, wherein the separable ceramic capacitor is provided over the insulating jacket.

7. The circuit interrupting device of claim 1, wherein the insulating housing includes:
   a first surface for connecting the insulating housing to a power distribution component; and
   a second surface for connecting the insulating housing to a mounting structure that is coupled to a utility pole.

8. The circuit interrupting device of claim 1, further comprising:
   a first overvoltage disconnect component electrically connected between the AC line voltage source and ground.

9. A recloser comprising:
   a terminal configured to electrically connect the recloser to a power line included in a power distribution network;
   one or more electronic components;
   a vacuum interrupter electrically connected between the terminal and the one or more electronic components, the vacuum interrupter including a first contact and a second contact movable relative to the first contact between a closed position and an open position;
   a separable ceramic capacitor electrically connected in parallel with the vacuum interrupter;
   an insulating housing that encloses the separable ceramic capacitor and the vacuum interrupter; and
   a harvester circuit configured to provide power to the one or more electronic components with power from the separable ceramic capacitor when the first and second contacts are in the open position, the harvester circuit includes:
      a rectifier configured to convert alternating current (AC) power flowing through the separable ceramic capacitor into direct current (DC) power output; and
      an electrolytic capacitor that is configured to provide the DC power output by the rectifier to the one or more electronic components.

10. The recloser of claim 9, wherein the separable ceramic capacitor surrounds the first and second contacts.

11. The recloser of claim 9, further comprising:
   a current transformer configured to provide power to the one or more electronic components with power from the power line when the first and second contacts are in the closed position.

12. The recloser of claim 9, wherein the harvester circuit further includes a zener diode electrically connected in parallel with the electrolytic capacitor; and wherein the electrolytic capacitor outputs DC power to the one or more electronic components at a voltage level that is approximately equal to a breakdown voltage of the zener diode.

13. The recloser of claim 9, wherein the separable ceramic capacitor includes a ceramic dielectric material provided between axially offset metallized plates, and wherein the separable ceramic capacitor is slidingly received over the vacuum interrupter.

14. A method of manufacturing a vacuum interrupter including a vacuum bottle enclosing first and second contacts, the method comprising:

sliding a separable ceramic capacitor over the vacuum bottle; and enclosing the vacuum bottle and the separable ceramic capacitor in an insulating housing.

15. The method of claim 14, further comprising forming the separable ceramic capacitor by providing a ceramic dielectric material between metallized plates.

16. The method of claim 15, further comprising axially offsetting the metallized plates.

17. The method of claim 14, wherein the separable ceramic capacitor is electrically connected in parallel with the vacuum bottle.

18. The method of claim 14, further comprising:

providing an insulating jacket around an outer surface of the vacuum bottle, wherein the separable ceramic capacitor is slid over the insulating jacket.

\*    \*    \*    \*    \*